Figure 3:
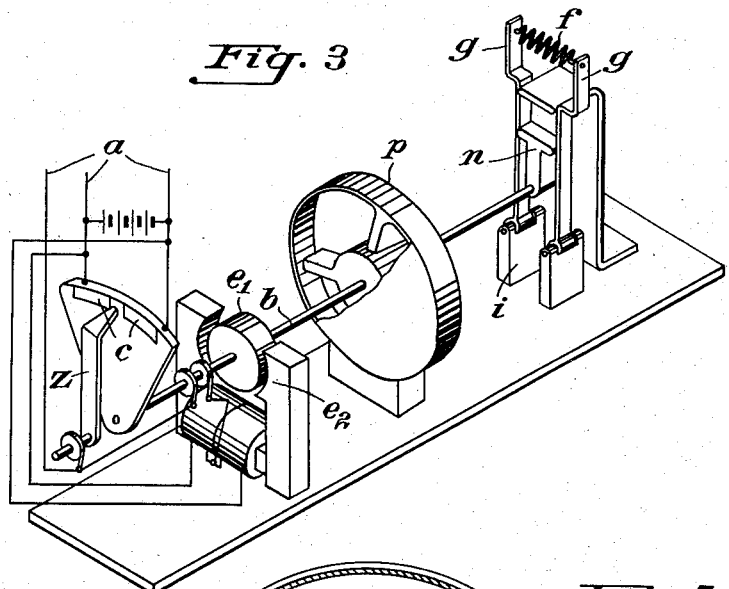

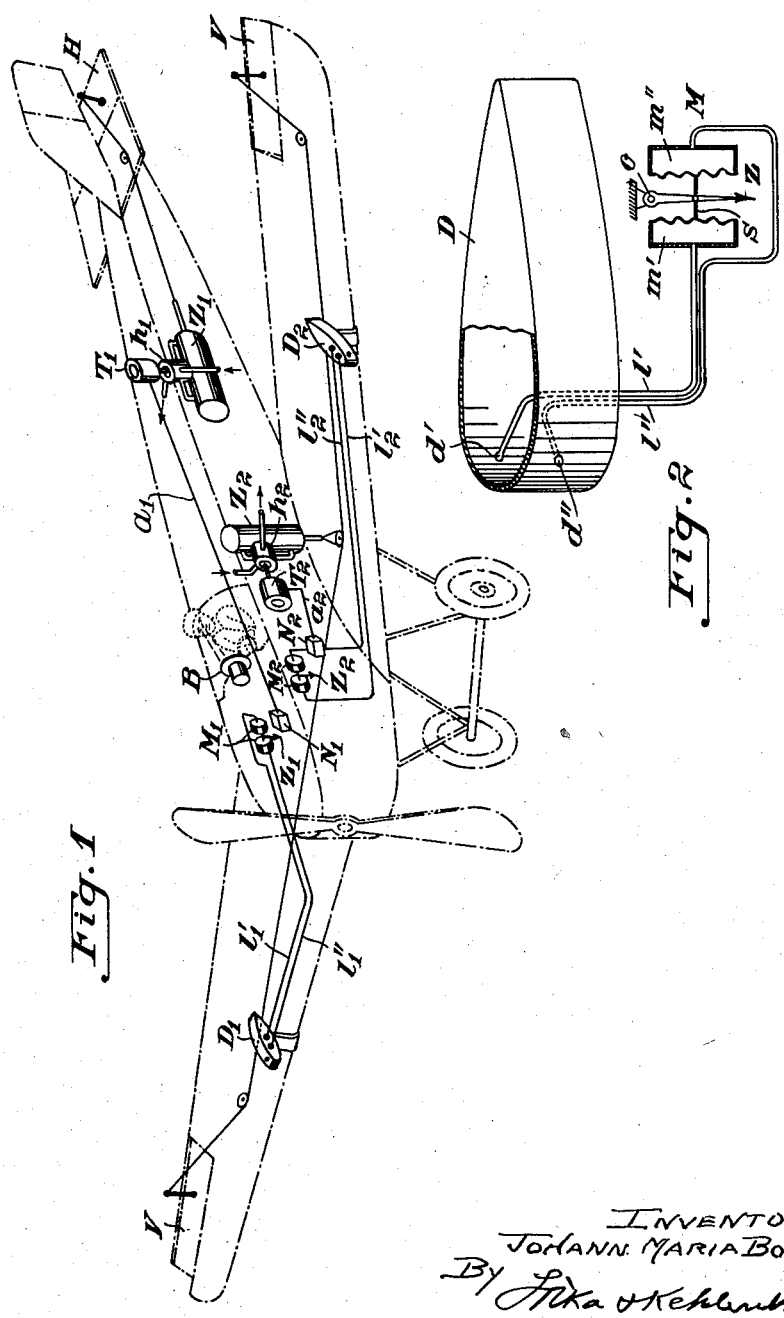

INVENTOR
JOHANN MARIA BOYKOW
BY
ATTORNEYS.

Patented Feb. 4, 1936

2,029,700

UNITED STATES PATENT OFFICE

2,029,700

INCLINATION RESPONSIVE DEVICE FOR AIRCRAFT

Johann Maria Boykow, Berlin-Lichterfelde-West, Germany, assignor to Deutsche Luftfahrt- und Handels-Aktien-Gesellschaft, Berlin, Germany, a corporation of Germany Application October 11, 1932, Serial No. 637,247
In Germany October 14, 1931

9 Claims. (Cl. 73—2)

My present invention relates to a device for measuring the velocity of side slip or vertical slip of aircraft; such side slip may for instance be due, in the case of an airplane, to a transverse inclination of the plane or to a wrong angle of incidence, while the vertical slip is connected with a rising or a falling motion of the airplane. For this purpose, I employ one or more nozzle members of stream-line cross section, carried by the airplane in a position exposed to the relative wind. Such a nozzle member has two nozzles, and suitable connections are provided for causing the pressures arising at these nozzles to be transmitted to a differential pressure gauge.

In carrying out my invention, the nozzle member (of cylindrical shape) is secured to the airplane, for instance to a wing thereof, in such a manner that the longitudinal symmetry plane of said member will be parallel to the plane determined by the longitudinal axis and the upright (normally vertical) axis of the airplane. The two nozzles are located on opposite sides of said member, at equal distances from its front edge. Thus the blasts striking the two nozzles will be of equal force as long as the relative wind is in the direction of the longitudinal axis of the airplane. In the event of a straight-line flight, this will be the case as long as the airplane is on a level transversely (in other words, when it has no transverse inclination) and furthermore does not perform any rapid oscillations about its upright axis. In the event of substantially level flight along a curved path, the relative wind will be in the direction of the longitudinal axis of the airplane when the plane of flight is perpendicular to the direction which is the resultant of gravity acceleration and centrifugal acceleration. However, as soon as the airplane, for instance owing to a shifting of weights within its body and the resultant change in its center of gravity, deviates from these zero positions and assumes an undesirable transverse inclination, it will sideslip in the direction of the temporarily lower wing (inwardly or outwardly when flying in a curved path) and in consequence thereof the relative wind due to the travel of the airplane will have a transverse component. At the beginning of the undesirable movement which inclines the airplane transversely, this transverse component will be relatively small, but it will increase rapidly. This transverse component of the relative wind will cause the particular nozzle which is on the side toward which the airplane is side-slipping, to receive a stronger blast than the other nozzle, and thus the differential pressure-gauge connected with these nozzles will exhibit a deflection or indication corresponding to the velocity of such side-slip.

The particular stream-line shape of the nozzle member renders it very sensitive. In practice, even side-slip velocities as low as 2 meters per second will produce a readily measurable difference between the pressures at the two nozzles of the nozzle member. My invention therefore permits any improper or undesirable transverse inclination of the airplane to be determined with great accuracy, and this is very important since other means, such as pendulums, are inadequate to determine or indicate slight transverse inclinations of an airplane, and yet it is well-known that even a very slight transverse inclination of an airplane will, after a sufficient lapse of time, produce a progressively increasing side-slip. It would be possible to operate the ailerons directly according to the indications of the differential pressure gauge. A satisfactory lateral stabilization of the airplane would, however, not be attained in this way, because it must be kept in mind that the side slip of the airplane has, due to the inertia of the masses, not yet stopped at the moment when the airplane has been righted into its horizontal position by the ailerons. The pilot will thus in case he operates the ailerons directly in accordance with the indications of this differential pressure gauge measuring the velocity of the side slip overcontrol the airplane, so that the plane will practically keep on rocking about its longitudinal axis, as will be readily understood.

In order to avoid this contingency, I interpose, according to another feature of my invention, between the differential pressure gauge and the control motor adjusting the ailerons (in the case of automatic control) or between the differential pressure gauge and the indicating instrument (in the case of manual control) a damping device, in itself known in conjunction with other apparatus, for displacing the control zero or base position. This arrangement may, for example, comprise a contact arm adapted to be shifted by the differential pressure gauge and co-operating with a control member to which is imparted an adjustable follow-up and restoring moment by a torque or moment generator, such as a rotary magnet, so that this torque or moment tends to neutralize the deflection of the contact arm. Owing to this arrangement, the contact arm will return to its zero position relatively to a contact segment whose position is controlled by the moment generator, even before the deflection of the pressure gauge and the slip of the airplane stop.

This is an expedient well known per se for bringing the airplane, by a damped movement, from its inclined position to a horizontal one.

The elevator control gear according to my invention is substantially the same as the above described control gear of the ailerons. For the elevator control it should be noted that the wings of the airplane form a certain angle with the horizontal, the so-called angle of incidence, with the relative wind or direction of motion. The nozzles serving for the elevator control must therefore be so located and directed that the air pressure is symmetrical when the airplane travels horizontally, in order that the indication of the pressure difference should be zero. If the aircraft becomes nose-heavy for some reason or other, there exists an incorrect adjustment of the angle of incidence, which causes a slip or sliding motion of the airplane in relation to the surrounding air, a downward slip if the nose of the airplane is depressed, and an upward slip if the nose of the airplane points upwards. Here also the velocity of this slip or sliding motion alone will as a rule suffice as a measure for the adjustment of the elevators. The velocity of the slip or sliding motion is preferably obtained as the difference between the pressures of two correspondingly arranged nozzles and again through the agency of a damping device for displacing the control zero position, which is necessary for preventing the airplane from rocking, made to act on the indicating instrument (in case of manual control) or on a control motor adapted to adjust the elevator (in case of automatic control).

In the case of manual control it is difficult for the pilot to carry out the correct setting of the ailerons and the elevator according to the indications of two separate instruments. For this reason the two adjusting values corresponding with the inclinations about the longitudinal and lateral axes of the airplane may, according to another feature of my invention, be transferred to a common indicating device, which may then serve as an artificial horizon. The construction of this horizon as well as further details of my invention are fully described in the following specification with reference to an embodiment of my invention diagrammatically illustrated in the drawings affixed to my specification and showing the invention applied to the control of an airplane.

Figure 5:
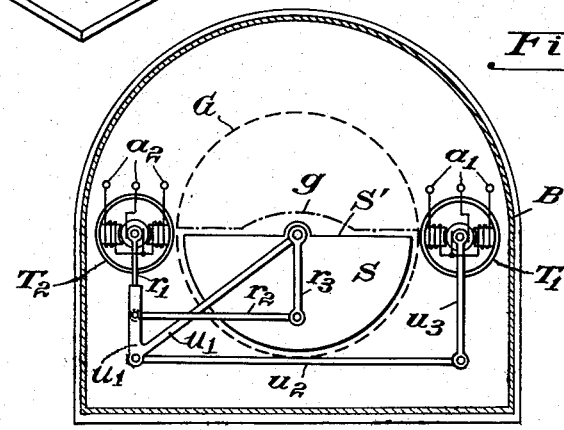
Figure 4:
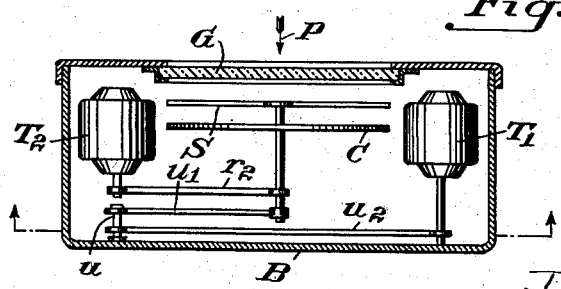

In the drawings:

Fig. 1 is a diagram of the arrangement of my improved control gear on an airplane, Fig. 2 shows the nozzle body serving for indicating the differential pressure corresponding to the velocity of the slip or sliding motion, in sectional perspective view, Fig. 3 is a perspective view of the mechanism serving for displacing the control zero position, Fig. 4 is a horizontal section through the artificial horizon indicator, and Fig. 5 shows the horizon according to Fig. 4 in front-elevation.

Referring to Fig. 1 of the drawings it will be seen that on the wings of the airplane indicated in its outlines there are mounted the nozzle members generally designated as D, as shown in Fig. 2, and more particularly with the right one on the ship designated as $D_1$, and the left one as $D_2$, in Fig. 1. As Fig. 2 of the drawings shows, each of these nozzle members consists of a cylinder of streamline cross-section. Equally spaced from the front edge of this member there are provided two nozzle openings $d'$ and $d''$ of similar design, to which are connected the two pressure pipes $l'$ and $l''$ which lead downwards through the wall of the nozzle body into the measuring chambers $m'$ and $m''$ respectively of a differential pressure gauge generally designated as M in Fig. 2, and more particularly as $M_1$ and $M_2$ respectively in Fig. 1. The two diaphragms of this pressure gauge are connected by means of a rod $s$, which in its turn is pivotally connected with the pointer or needle pivoted at $o$ and generally designated as $z$ in Figs. 2 and 3, and more particularly as $z_1$ and $z_2$ in Fig. 1. For the sake of more convenient illustration, the needle $z$ has been shown as pointing upwardly in Fig. 3, while the other views show downwardly pointing needles.

One nozzle member $D_1$ is so mounted on the wing of the airplane that its longitudinal symmetry plane is located parallel to the desired horizontal plane of the aircraft, i. e. the plane of the wing and the longitudinal symmetry plane of the nozzle body $D_1$ form between them the angle of incidence of the wing. The other nozzle body is displaced in relation to the first by an angle of 90°. Its longitudinal symmetry plane thus stands at right angles to the desired horizontal plane of the airplane.

The pressure difference between the two nozzles of the nozzle body $D_1$ or $D_2$ is indicated by the pointer or needle $z_1$ or $z_2$ respectively of the differential pressure gauge $M_1$ or $M_2$ respectively. These pointers cooperate as contact arms with damping devices $N_1$ and $N_2$ respectively for displacing the control zero position. One such device is shown in greater detail in Fig. 3 of the drawings. To this damping device, which in conjunction with the contact pointer $z_1$ or $z_2$ respectively acts as a switch, is connected a torque generator or moment generator $T_1$ or $T_2$ respectively consisting, for instance, of an armature pivoted within an electromagnetic field and having a pivoted armature returned to a normal position by a spring (not shown) and rigidly or otherwise operatively connected with a two-way cock $h_1$ or $h_2$ (Fig. 1), which according to the direction of the movement given to it puts one or the other side of a hydraulic cylinder $Z_1$ or $Z_2$ provided for the adjustment of the elevator H or the ailerons V in communication with the hydraulic pressure or suction pipe. These pipes are shown in Fig. 1, with arrows indicating the direction in which the pressure fluid flows. According to the angular extent of the movement given to the pivoted armature, the corresponding cock will be opened more or less. It will be understood, however, that instead of these hydraulic cylinders other customary auxiliary motors may be employed for the adjustment of the control surfaces. As indicated in Fig. 1, the piston rod of the hydraulic cylinder $Z_1$ controls the elevator H by suitable cords or other operative connections, and the piston rod of the hydraulic cylinder $z_2$ similarly controls the ailerons V.

The damping device interposed between the contact pointer $z$ of the differential pressure gauge and the torque generator $T_1$ or $T_2$ will now be more fully described with reference to Fig. 3 of the drawings.

The contact pointer $z$, sweeps across a segmental contact track $c$, which is not stationary but able to turn with a shaft $b$ located in line with the shaft of the pointer $z$. On this shaft $b$ is secured rigidly the armature $e_1$ arranged to turn between the stationary magnets $e_2$ of an electromagnetic torque generator, which when the pointer $z$ slides on to the left-hand or right-hand contact segment $c$ is energized in such a direction that the armature $e_1$ turns the contact segment $c$ so as to follow the pointer $z$, and thus tends to break contact again. It will be understood that the torque generator ($e_1$, $e_2$) forming part of the damping device $N_1$ or $N_2$ is separate from the torque generators $T_1$, $T_2$.

The armature $e_1$ of the torque generator is by means of a spring $f$ resiliently maintained in a definite zero position, if the torque generator is not energized. The spring $f$ exerts a pull on two arms $g$ journaled on the lugs or brackets $i$. Between these arms is located the T-shaped member $n$ mounted on the shaft $b$. The spring $f$ must be subjected to a preliminary tension of such order that it overcomes the mechanical friction between the segments $c$ and the pointer $z$ of the switch, in order to make sure that the switch is always pulled back into the zero position. The shaft $b$ is at the same time damped by means of a hydraulic brake $p$ in dependence upon its speed of rotation.

The strength of the excitation of the torque generator shown in Fig. 3 and the elastic suspension in the zero position as well as the damping device $p$ are so chosen that the rotary speed of the contact segment $c$ due to the excitation of the torque generator and the rotary speed with which this contact segment $c$ tends to attain its zero position due to the elastic suspension, when the torque generator is not energized, stand in such relation to each other that the most favorable control effect is attained thereby. In the present case the rotary speed under the action of the torque generator must be considerably higher than the rotary speed under the action of the spring $f$.

To the supply circuit $a$ is connected the torque generator $T_1$ or $T_2$ for adjusting the piston of the hydraulic cylinder or control motor $z_1$ or $z_2$ respectively. In Fig. 1, the supply circuit or controlling circuit of the torque generator $T_1$ is indicated diagrammatically by a single line $a_1$, and that of the torque generator $T_2$ by a single line $a_2$.

The mode of operation of the apparatus illustrated in Figs. 1 to 3 of the drawings as regards the elevator control is as follows: As soon as the airplane is turned out of its horizontal position about its lateral axis due to a displacement of weight or a gust, so that its nose is raised or pushed down, the angle of attack of the air current at the nozzle body $D_1$ is changed. While in the horizontal position of the airplane the air pressures were equal at both nozzles and the pointer $z_1$ consequently occupied the zero position, the air pressure at one nozzle now becomes higher and at the other nozzle lower. Tests have shown that at a normal velocity of flight a deflection of the relative wind direction amounting to one degree in relation to the symmetry plane of the nozzle member $D_1$ causes differential pressures at the nozzles amounting to several centimetres of water. The utilization of this difference in pressure as a measure for the velocity of the slip or sliding motion of the airplane thus gives very accurate values. The contact pointer $z_1$ performs a deflection corresponding with the velocity of the upwards slip of the airplane and, across the contact segment $c$ equipped with the damped restoring motion and the lines $a_1$, connects to the rotary magnet $T_1$ for adjusting the two-way cock in such a direction, that the auxiliary motor $Z_1$ adjusts the elevator in a direction which causes the righting of the airplane into its horizontal position. The torque generator $e_1$, $e_2$, Fig. 3, causes the contact between the pointer $z$ and the segment $c$ to be broken again before the airplane has attained its horizontal position. Usually a plurality of impulses of the pointer $z$ will be necessary to bring the elevator H by means of the motor $Z_1$ into the position corresponding with the magnitude of the disturbance at the time and then to maintain the airplane in the correct horizontal position.

The aileron control gear designated by the indices "2" does not respond as long as the relative wind has no appreciable lateral or transverse component, because until then the air pressures at the two nozzles of the nozzle body $D_2$ are equal, so that the pointer $z_2$ is at rest in its zero position. An appreciable lateral component of the relative wind can develop only when the airplane side-slips, i. e. if the position of equilibrium about the longitudinal axis of the airplane is disturbed in consequence of any action upon the airplane. As soon as this happens a horizontal transverse component develops which is directed towards the lower side of the airplane and imparts to the airplane a slip or sliding motion directed perpendicularly to its direction of flight. The pressure difference then obtained at the differential pressure gauge $M_2$ is an accurate, extraordinarily sensitive measure for the value of the velocity of this slip or sliding motion. The electric follow-up switchgear $N_2$ for the displacement of the control zero position operates precisely as already described with reference to the elevator control gear. It is necessary that this should be so because in the control of the ailerons as well a slip or sliding velocity is still indicated by the pointer $z_2$ when the airplane has already been righted or attained its horizontal position about the longitudinal axis. In consequence of the fact that the torque generator correspondingly displaces the control zero position of the pointer $z_2$, the over-control of the ailerons V is effectively prevented. As soon as the slip or sliding motion ceases, the retrieving spring $f$ turns the contact segment $c$ back into the zero position.

As soon as the airplane pitches or banks about its lateral or longitudinal axis, slipping or sliding motions occur sideways, upwards or downwards, the velocities of which are measured with great accuracy by the differential pressure gauges $M_1$ and $M_2$. By the deflections of the differential pressure gauges not only the torque generators $T_1$ and $T_2$, but also the torque generators $e_1$, $e_2$ of the mechanisms $N_1$ and $N_2$ are switched into circuit, the latter torque generators effecting such a premature disconnection of the rotary magnets $T_1$ and $T_2$ that the control surfaces H and V are not stalled, thereby insuring a damped return of the airplane into its horizontal position. As soon as the control surfaces H and V occupy the new position corresponding with the value of the disturbance (displacement of weight or action of gusts), the torque generators $T_1$, $T_2$ are cut out and the control motors $Z_1$ and $Z_2$ stopped thereby.

The control apparatus described above functions perfectly automatically. It is, of course, possible to cause the torque generators $T_1$ and $T_2$ to adjust indicating instruments, from the readings of which the pilot sets the elevators and ailerons by hand. A preferred construction of such an indicating instrument is illustrated in Figs. 4 and 5 of the drawings, the indicating elements for both inclinations of the airplane being combined in such a manner that the pilot is given the impression of a natural horizon. This horizon is arranged in the box B in the manner shown in Fig. 1 of the drawings, viz. at the pilot's seat and directly in front of the pilot. The pilot will even in clear weather not steer the airplane according to the true horizon but always according to this artificial horizon.

In Figs. 4 and 5 the torque generators $T_1$ and $T_2$ connected to the mechanisms $N_1$ and $N_2$ by means of the electric lines $a_1$ and $a_2$, are accommodated in the box B of the indicating device. S is a semi-circular metal disk whose diametral line S' symbolizes the horizon. This disk represents the earth and is preferably provided with colored stripes to give the pilot the impression of land across which he is travelling at the time. In front of the metal disk S there is fitted in the box B a circular pane of glass G on which is drawn the picture of the profile of the cowling of the engine i. e. that which the pilot usually sees from his seat in the airplane. The semi-circular disk S can be rocked with its shaft from the torque generator $T_2$ by means of the linkwork $r_1$—$r_3$, for which purpose the lever $r_3$ is keyed to the shaft of this disk. Independently of this the disk S is adapted to be raised and lowered vertically by means of the bell-crank lever $u_1$ mounted on the stationary pivot $u$, the torque generator $T_1$ engaging the knee of the bell-crank lever $u_1$ by means of levers $u_2$ and $u_3$. The pivot $u$ of the bell-crank lever is located in the continuation of the shaft of the torque generator $T_2$. If the airplane descends in gliding flight, the torque generator $T_1$ lifts the disk S; the pilot looking in the direction of the arrow P thus sees the horizon rising over the cowling of the engine. If the airplane ascends he sees the horizon descend behind the engine cowling $g$. These occurrences happen in front of the stationary disk C, which symbolizes the firmament and for this purpose is stained sky-blue. If the airplane banks about its longitudinal axis the rotary magnet $T_2$ turns the metal disk S in relation to the airplane, as will now be understood without further description, so that the horizon line $S^1$ remains in reality horizontal. From the position of the semi-circular disk S between the disks G and C the pilot thus receives an absolutely accurate picture of the position of his airplane. In consequence of the silhouette $g$ of the airplane, the earth horizon S' and the firmament (C) being arranged at intervals behind one another in the appliance, the illusion of the pilot is strengthened, so that he has the natural landscape in front of him, on a reduced scale. The pilot need not accustom himself to such a blind flight appliance in any way, i. e. he steers his airplane according to the illusional horizon exactly as usual in the case of good visibility.

I claim as my invention:

1. In a device of the character described, the combination of two cylindrical nozzle members of stream-line cross section arranged on the exterior of an aircraft and extending lengthwise thereof, the longitudinal symmetry plane of one of said members being parallel to the plane determined by the longitudinal and the upright axes of the aircraft, the longitudinal symmetry plane of the other nozzle member being parallel to the plane determined by the longitudinal and the transverse axes of the aircraft, two nozzles located on the first-mentioned nozzle member at equal distances from its front edge, two nozzles located on the other nozzle member at equal distances from its front edge, two differential pressure-gauges, conduits connecting each of said gauges with the two nozzles of the respective nozzle member, and a device, controlled by both of said pressure-gauges, for indicating the horizontal and the vertical transverse components of the relative wind.

2. In a device of the character described, the combination of two nozzle members arranged on the exterior of an aircraft and extending lengthwise thereof, two nozzles located on each of said members at equal distances from its front edge, the nozzles on one of said members being superposed, and those on the other member being located in alignment transversely of the aircraft, two differential pressure-gauges, each connected with the two nozzles of the respective nozzle member, and a device, controlled by both of said pressure-gauges, for indicating the horizontal and the vertical transverse components of the relative wind.

3. In a device of the character described, the combination of two nozzle members arranged on the exterior of an aircraft and extending lengthwise thereof, two nozzles located on each of said members at equal distances from its front edge, the nozzles on one of said members being at different levels, and those on the other member being located laterally of each other, two differential pressure-gauges, each connected with the two nozzles of the respective nozzle member, and a device, controlled by both of said pressure-gauges, for indicating the horizontal and the vertical transverse components of the relative wind.

4. In a device of the character described, an indicating device for the banking and pitching of an aircraft, consisting of a disk stationary relatively to the aircraft, a member mounted to turn relatively to said disk and also movable in its own plane, said member being provided with a line symbolizing the horizon, a first driving gear for shifting said member in its own plane, a pair of nozzles so arranged as to be exposed to different pressures when the aircraft pitches, a controlling device connected with said nozzles and responsive to a difference between the pressures existing at said nozzles, an operative connection between said controlling device and said first driving gear, a second driving gear for turning said member, another pair of nozzles so arranged as to be exposed to different pressures when the aircraft is banked, a second controlling device connected with such second pair of nozzles and responsive to a difference between the pressures existing at the nozzles of such second pair, and an operative connection between said second controlling device and said second driving gear.

5. In a device of the character described, an indicating device for the banking and pitching of an aircraft, consisting of a disk stationary relatively to the aircraft, a semi-circular disk arranged in front of said first-mentioned disk, said semi-circular disk being mounted to turn relatively to the first-mentioned disk and also movable in its own plane, a stationary member arranged in front of said disks and reproducing the profile of the aircraft, a first driving gear for shifting said semi-circular disk in its own plane, a pair of nozzles so arranged as to be exposed to different pressures when the aircraft pitches, a controlling device connected with said nozzles and responsive to a difference between the pressures existing at said nozzles, an operative connection between said controlling device and said driving gear, a second driving gear for turning said semi-circular disk, another pair of nozzles so arranged as to be exposed to different pressures when the aircraft is banked, a second controlling device connected with such second pair of nozzles and responsive to a difference between the pressures existing at the nozzles of such second pair, and an operative connection between said second controlling device and said second driving gear.

6. In a device of the character described, an indicating device for the banking and pitching of an airplane, comprising a stationary box located in front of the pilot's seat, a stationary disk secured to said box, a second disk mounted to turn and also shiftable bodily and provided with a line symbolizing the horizon, a window in said box, provided with a line reproducing the profile of the aircraft as seen by the pilot from his seat, a first driving gear for shifting said second disk, a pair of nozzles so arranged as to be exposed to different pressures when the aircraft pitches, a controlling device connected with said nozzles and responsive to a difference between the pressures existing at said nozzles, an operative connection between said controlling device and said driving gear, a second driving gear for turning said second disk, another pair of nozzles so arranged as to be exposed to different pressures when the aircraft is banked, a second controlling device connected with such second pair of nozzles and responsive to a difference between the pressures existing at the nozzles of such second pair, and an operative connection from said second controlling device to said second driving gear.

7. In a device of the character described, an indicating device for the banking and pitching of an aircraft, comprising a disk stationary relatively to the aircraft, a member mounted to turn relatively to said disk and also movable in its own plane, said member being provided with a line symbolizing the horizon, a first driving gear for shifting said member in its own plane, a first controlling device responsive to pressure differences occurring when the aircraft pitches, an operative connection between said controlling device and said first driving gear, a second driving gear for turning said member, a second controlling device responsive to pressure differences occurring when the aircraft is banked, and an operative connection between said second controlling device and said second driving gear.

8. In a device of the character described, an indicating device for the banking and pitching of an aircraft, comprising a disk stationary relatively to the aircraft, a semi-circular disk arranged in front of said first mentioned disk, said semi-circular disk being mounted to turn relatively to the first mentioned disk and also movable in its own plane, a stationary member arranged in front of said disks and reproducing the profile of the aircraft, a first driving gear for shifting said semi-circular disk in its own plane, a first controlling device responsive to pressure differences occurring when the aircraft pitches, an operative connection between said controlling device and said driving gear, a second driving gear for turning said semi-circular disk, a second controlling device responsive to pressure differences occurring when the aircraft is banked, and an operative connection between said second controlling device and said second driving gear.

9. In a device of the character described, an indicating device for the banking and pitching of an airplane, comprising a stationary box located in front of the pilot's seat, a stationary disk secured to said box, a second disk mounted to turn and also shiftable bodily and provided with a line symbolizing the horizon, a window in said box, provided with a line reproducing the profile of the aircraft as seen by the pilot from his seat, a first driving gear for shifting said second disk, a first controlling device responsive to pressure differences occurring when the aircraft pitches, an operative connection between said controlling device and said driving gear, a second driving gear for turning said second disk, a second controlling device responsive to pressure differences occurring when the aircraft is banked, and an operative connection from said second controlling device to said second driving gear.

JOHANN MARIA BOYKOW.